US010491082B2

(12) United States Patent
Oikawa et al.

(10) Patent No.: US 10,491,082 B2
(45) Date of Patent: Nov. 26, 2019

(54) PERMANENT-MAGNET ELECTRIC MOTOR (71) Applicant: Mitsubishi Electric Corporation, Tokyo (JP)

(72) Inventors: Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP); Takaya Shimokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 314 days.

(21) Appl. No.: 15/560,691

(22) PCT Filed: Jun. 15, 2015

(86) PCT No.: PCT/JP2015/067181
§ 371 (c)(1),
(2) Date: Sep. 22, 2017

(87) PCT Pub. No.: WO2016/203524
PCT Pub. Date: Dec. 22, 2016

(65) Prior Publication Data
US 2018/0109167 A1   Apr. 19, 2018

(51) Int. Cl.
*H02K 11/215* (2016.01)
*H02K 1/27* (2006.01)
(Continued)

(52) U.S. Cl.
CPC ............ *H02K 11/215* (2016.01); *H02K 1/27* (2013.01); *H02K 15/03* (2013.01); *H02K 29/08* (2013.01);
(Continued)

(58) Field of Classification Search
CPC ........ H02K 11/215; H02K 15/03; H02K 1/27; H02K 1/2733; H02K 2213/03;
(Continued)

(56) References Cited

U.S. PATENT DOCUMENTS 7,518,273 B2   4/2009   Kataoka et al.
7,723,877 B2   5/2010   Hiwaki et al.
(Continued)

FOREIGN PATENT DOCUMENTS

CN   104067483 A     9/2014
JP   H02-33586 U    3/1990
(Continued)

OTHER PUBLICATIONS

Office Action dated Jul. 8, 2019 issued in corresponding ID patent application No. P00201708392 (and English translation).
(Continued)

*Primary Examiner* — Nguyen Tran
*Assistant Examiner* — Demetries A Gibson
(74) *Attorney, Agent, or Firm* — Posz Law Group, PLC (57) ABSTRACT

A permanent-magnet electric motor includes: a rotor; and a rotational-position detection sensor configured to detect a rotational position of the rotor. The rotor includes: a rotating shaft; an annular ferrite magnet disposed on an outer circumferential surface of the rotating shaft; and a rare-earth magnet disposed on an outer circumferential surface of the ferrite magnet, and a length from a center of the ferrite magnet in an axial direction of the ferrite magnet to an end face of the ferrite magnet on a side of the rotational-position detection sensor in the axial direction of the ferrite magnet is longer than a length from a center of the rare-earth magnet in an axial direction of the rare-earth magnet to an end face
(Continued)

of the rare-earth magnet on a side of the rotational-position detection sensor in the axial direction of the rare-earth magnet.

5 Claims, 4 Drawing Sheets (51) Int. Cl.
 *H02P 29/66* (2016.01)
 *H02K 15/03* (2006.01)
 *H02K 29/08* (2006.01)
(52) U.S. Cl.
 CPC .......... *H02P 29/662* (2016.11); *H02K 1/2706* (2013.01); *H02K 1/2726* (2013.01); *H02K 2213/03* (2013.01)
(58) Field of Classification Search
 CPC .... H02K 1/2726; H02K 1/2706; H02K 29/08; H02P 29/662; H02P 6/16
 See application file for complete search history.

(56) References Cited

U.S. PATENT DOCUMENTS

| 9,455,600 | B2 | 9/2016 | Yamamoto et al. | |
|---|---|---|---|---|
| 2013/0113323 | A1* | 5/2013 | Yamada | H02K 1/2706 310/156.07 |
| 2014/0346911 | A1* | 11/2014 | Tsuchida | H02K 1/276 310/156.53 |
| 2016/0197527 | A1* | 7/2016 | Yamada | H02K 1/2706 310/156.21 |
| 2016/0254710 | A1* | 9/2016 | Fralick | H02K 1/14 310/208 |
| 2017/0222528 | A1* | 8/2017 | Tsuchida | H02K 21/16 |

FOREIGN PATENT DOCUMENTS

| JP | H06-038479 A | 2/1994 |
|---|---|---|
| JP | H09-093842 A | 4/1997 |
| JP | 2006-019573 A | 1/2006 |
| JP | 2006-174526 A | 6/2006 |
| JP | 2007-110864 A | 4/2007 |
| JP | 2007-151314 A | 6/2007 |
| JP | 2007-221866 A | 8/2007 |
| JP | 2007-221976 A | 8/2007 |
| JP | 2009-011125 A | 1/2009 |
| JP | 2011-061938 A | 3/2011 |
| JP | 2012-151979 A | 8/2012 |
| WO | 2013/111301 A1 | 8/2013 |
| WO | 2013/114541 A1 | 8/2013 |

OTHER PUBLICATIONS

Office Action dated Jul. 25, 2019 issued in corresponding CN patent application No. 201580079786.3 (and English translation).
Office Action dated Dec. 5, 2018 issued in corresponding CN patent application No. 201580079786.3 (and partial English translation).
International Search Report of the International Searching Authority dated Aug. 25, 2015 for the corresponding international application No. PCT/JP2015/067181 (and English translation).

* cited by examiner

PERMANENT-MAGNET ELECTRIC MOTOR

CROSS REFERENCE TO RELATED APPLICATION

This application is a U.S. national stage application of International Patent Application No. PCT/JP2015/067181 filed on Jun. 15, 2015, the disclosure of which is incorporated herein by reference.

TECHNICAL FIELD

The present invention relates to a permanent-magnet electric motor that includes a stator, a rotor, and a rotational-position detection sensor that detects a rotational position of the rotor.

BACKGROUND

In a conventional electric motor described in Patent Literature 1 below, the axial length of a permanent magnet constituting a rotor is formed longer than the axial length of a stator, and a sensor for detecting the rotational position of the rotor is provided at a position facing an extended portion extending in the axial direction of the permanent magnet. According to this configuration, it is unnecessary to provide the rotor with a permanent magnet for detecting the rotational position, and the cost can be reduced.

PATENT LITERATURE

Patent Literature 1: Japanese Patent Application Laid-Open No. H06-38479

In recent years, rare-earth magnets, which are more expensive than ferrite magnets, have often been used for the permanent magnets of the rotors because of the growing need for further improvement in the efficiency of the electric motors. In such a rotor including the rare-earth magnet, in order to improve the accuracy of detecting the rotational position of the rotor in the rotational-position detection sensor, it is necessary to extend one axial end of the rare-earth magnet close to the rotational-position detection sensor. However, in a case where the one axial end of the rare-earth magnet is extended for the rotational-position detection, a portion of the entire rare-earth magnet which does not face the stator does not contribute to the motor torque, which causes the problem of an increase in the cost of the rotor.

SUMMARY

The present invention has been made in view of the above, and an object thereof is to obtain an electric motor capable of improving the efficiency while suppressing an increase in the cost.

There is provided a permanent-magnet electric motor according to an aspect of the present invention including: a rotor; and a rotational-position detection sensor to detect a rotational position of the rotor, wherein the rotor includes: a rotating shaft; an annular ferrite magnet disposed on an outer circumferential surface of the rotating shaft; and a rare-earth magnet disposed on an outer circumferential surface of the ferrite magnet, and a length from a center of the ferrite magnet in an axial direction of the ferrite magnet to an end face of the ferrite magnet on a side of the rotational-position detection sensor in the axial direction of the ferrite magnet is longer than a length from a center of the rare-earth magnet in an axial direction of the rare-earth magnet to an end face of the rare-earth magnet on a side of the rotational-position detection sensor in the axial direction of the rare-earth magnet.

The permanent-magnet electric motor according to the present invention has an effect of improving the efficiency while suppressing an increase in the cost.

DETAILED DESCRIPTION

Hereinafter, a permanent-magnet electric motor according to an embodiment of the present invention will be described in detail based on the drawings. The present invention is not limited to the embodiment.

Embodiment

Figure 1:
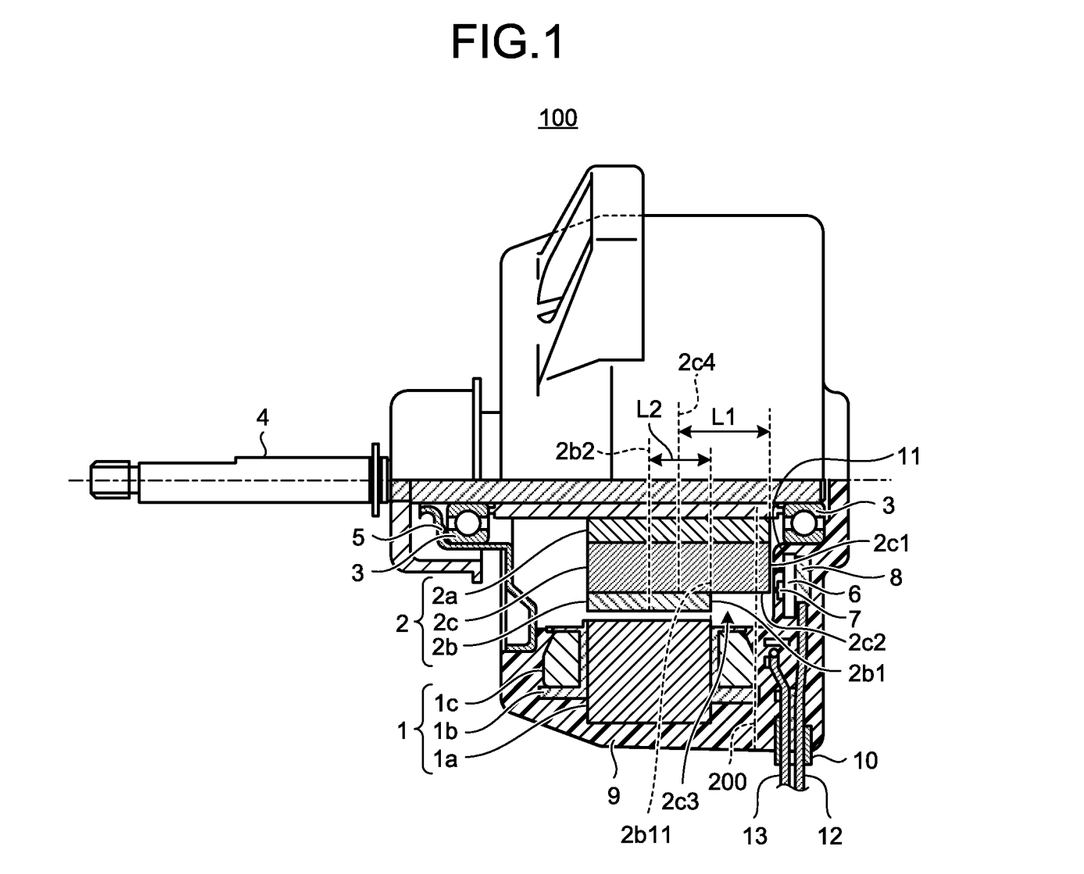
FIG. 1 is a side view of a permanent-magnet electric motor according to an embodiment of the present invention.

FIG. 1 is a side view of a permanent-magnet electric motor according to an embodiment of the present invention. An electric motor 100, which is the permanent-magnet electric motor, includes a stator 1, a rotor 2, a rotating shaft 4, a pair of bearings 3, a control board 6, a rotational-position detection sensor 7, a mold resin 9, and a bracket 5. The rotor 2 is disposed inside the stator 1. The rotating shaft 4 penetrates the center of the rotor 2. The pair of bearings 3 rotatably supports the rotating shaft 4. The rotational-position detection sensor 7 is located on a side of end face of the rotor 2 in an axial direction thereof, and disposed on the control board 6. The mold resin 9 is formed of a thermosetting resin to constitute a housing 11. The housing 11 constitutes an outer shell of the electric motor 100, and surrounds an outer race of the bearing 3 disposed on a side of one end of the stator 1. The bracket 5 surrounds an outer race of the bearing 3 disposed on the other end side of the stator 1, and is fit into the inner circumferential surface of an opening portion formed by the mold resin 9.

The stator 1 includes a stator core 1a, an insulator 1b, and a winding 1c. The stator core 1a is formed by laminating a plurality of iron core pieces punched out from an electromagnetic steel sheet base material with a thickness of 0.2 mm to 0.5 mm. The insulator 1b is formed integrally with the stator core 1a, or manufactured separately from the stator core 1a and fit into the stator core 1a. The winding 1c is made of copper or aluminum, and wound around teeth, which are not illustrated, of the stator core 1a. The insulator 1b is made of an insulating resin or paper such as polybutylene terephthalate (PBT), polyphenylene sulfide (PPS), liquid crystal polymer (LCP), and polyethylene terephthalate (PET).

The rotor 2 includes a rotor core 2a, a rare-earth magnet 2b, and a ferrite magnet 2c. The rotor core 2a is provided on the outer circumference of the rotating shaft 4. The rare-earth magnet 2b is disposed on the outer circumference of the rotor 2. The ferrite magnet 2c is disposed between the rotor core 2a and the rare-earth magnet 2b. One axial end face 2c1 of the ferrite magnet 2c is located close to the rotational-position detection sensor 7 with respect to an extension line 2b11 of one axial end face 2b1 of the rare-earth magnet 2b, and one axial end portion 2c3 of the ferrite magnet 2c faces the rotational-position detection sensor 7. For the rare-earth magnet 2b, an Nd—Fe—B-based magnet including neodymium (Nd), ferrum (Fe), and boron (B) or an Sm—Fe—N-based magnet including samarium (Sm), ferrum, and nitrogen (N) is used.

Assuming that the length from a center 2c4 of the ferrite magnet 2c in the axial direction to the one axial end face 2c1 of the ferrite magnet 2c that is on a side of the rotational-position detection sensor 7 of the ferrite magnet 2c is L1, and the length from a center 2b2 of the rare-earth magnet 2b in the axial direction to the one axial end face 2b1 of the rare-earth magnet 2b is L2, the electric motor 100 has such a shape in which L1 is longer than L2. The reason why the ferrite magnet 2c is disposed inside the rare-earth magnet 2b is that in a case where the rare-earth magnet 2b having a stronger magnetic force than the ferrite magnet 2c is disposed at a position close to the stator core 1a, the magnetic force can be increased, and advantageous motor characteristics can be obtained, as compared with a case where the ferrite magnet 2c is disposed at a position close to the stator core 1a.

The axial length of the ferrite magnet 2c and the axial length of the rare-earth magnet 2b will be described. The motor torque is generated by attraction and repulsion between the magnetic flux of the magnet and the magnetic flux in the stator core 1a generated by passing an electric current through the winding 1c wound around the stator 1. Therefore, it is desirable from the viewpoint of cost that the axial length of the rare-earth magnet 2b, which causes most of the magnetic fluxes for generating the motor torque, have the same dimension as the axial length of the stator core 1a. However, even in a case where the axial length of the rare-earth magnet 2b is different from the axial length of the stator core 1a, the magnetic fluxes generated on both axial ends of the rare-earth magnet 2b among the magnetic fluxes generated from the rare-earth magnet 2b, that is, the magnetic fluxes output from portions of the outer circumferential surface of the rare-earth magnet 2b which do not face the inner surface of the stator core 1a, go around and are taken into the stator core 1a. Therefore, the above-mentioned same dimension means the dimension obtained by adding a value of 10% of the axial length of the stator core 1a to the axial length of the stator core 1a, or the dimension obtained by subtracting a value of 10% of the axial length of the stator core 1a from the axial length of the stator core 1a. In other words, the above-mentioned same dimension is the axial length of the rare-earth magnet 2b in consideration of the range adjusted on the basis of the cost and characteristics of the rare-earth magnet 2b.

On the other hand, the axial length of the ferrite magnet 2c is longer than the axial length of the stator core 1a and longer than the axial length of the rare-earth magnet 2b. Furthermore, the one axial end face 2c1 of the ferrite magnet 2c extends close to the rotational-position detection sensor 7. The reasons are as follows. The rotational-position detection sensor 7 detects the rotational position of the rotor 2 by detecting a change in the magnetic fluxes on the one axial end face 2c1 of the ferrite magnet 2c. However, there is a possibility of malfunction due to an influence of the magnetic fluxes generated by the current flowing through the winding 1c of the stator 1. For this reason, the rotational-position detection sensor 7 is disposed apart from the winding 1c of the stator 1. However, in order to accurately detect the rotational position of the rotor 2, the one axial end face 2c1 of the ferrite magnet 2c needs to extend close to the rotational-position detection sensor 7. In the illustrated example, the one axial end face 2c1 of the ferrite magnet 2c is orthogonal to the rotating shaft 4 illustrated in FIG. 1, and located close to the rotational-position detection sensor 7 with respect to a line segment 200 where the coil end is present. The ferrite magnet 2c only needs to extend in a direction of the one end side close to the rotational-position detection sensor 7.

The rotational-position detection sensor 7 detects the change in the magnetic fluxes on the one axial end face 2c1 of the ferrite magnet 2c, thereby specifying the position of the rotor 2 in the rotational direction, and outputting a position detection signal. A motor drive circuit, which is not illustrated, controls the operation of the permanent-magnet electric motor by applying a current to the winding 1c by the use of the position detection signal that is output from the rotational-position detection sensor 7.

The rotational-position detection sensor 7 is disposed on the surface of the control board 6 close to the stator 1. In addition to the rotational-position detection sensor 7, a leading component 10 that introduces a power lead wire 13 and a sensor lead wire 12 into the electric motor 100 is provided on the control board 6. The power lead wire 13 is exposed to the outside through the mold resin 9, and supplies electric power to the winding 1c. A board-in connector 8 connected to the end of the sensor lead wire 12 is disposed on the control board 6, and a terminal of the board-in connector 8 is electrically connected to an electronic component using solder. After the control board 6 is assembled to the stator 1, the stator 1 is molded with the mold resin 9, and a mold stator is obtained. The rotor 2 with the bearing 3 mounted on the one end side thereof is inserted into the mold stator, and the bracket 5 is assembled, whereby the electric motor 100 is obtained.

As described above, the permanent magnet of the rotor 2 has a two-layer structure of the rare-earth magnet 2b disposed on the outer circumferential side of the rotor 2 and the ferrite magnet 2c disposed inside the rare-earth magnet 2b, and the axial length of the rare-earth magnet 2b is different from the axial length of the ferrite magnet 2c. Owing to the above configuration, the following effects can be obtained.

(1) Because the ferrite magnet 2c is disposed inside the rare-earth magnet 2b, the magnetic force of the ferrite magnet 2c assists the magnetic force of the rare-earth magnet 2b. Therefore, even though the radial thickness of the rare-earth magnet 2b is relatively thin, the magnetic force of the entire permanent magnet constituting the rotor 2 can be maintained, and the usage of the rare-earth magnet 2b is reduced, whereby the cost-efficient rotor can be obtained.

(2) In the case of a small motor, the rare-earth magnet used for the rotor is often magnetized in the polar anisotropic orientation. On the other hand, because the rare-earth magnet has a stronger magnetic force than the ferrite magnet, it is possible to obtain a rotor having excellent magnetic characteristics such as magnetic flux density and coercive force even though the radial thickness of the rare-earth magnet is thin. However, the thinner the radial thickness of the rare-earth magnet is, the more disturbance occurs in the waveform of the magnetic line due to the magnetic line penetrating the rotor core disposed inside the rare-earth magnet. Because the rotor 2 according to the present embodiment is configured in such a manner that the ferrite magnet 2c is disposed inside the rare-earth magnet 2b, no magnetic line penetrates the rotor core 2a, and the magnetic line can be brought close to an ideal sinusoidal wave.

(3) The ferrite magnet 2c is made of a material having a larger bending strain amount than the material used for the rare-earth magnet 2b. Therefore, by disposing the ferrite magnet 2c inside the rare-earth magnet 2b, it is possible to prevent magnet cracking that occurs during the molding of the permanent magnet or during a temperature cycle test.

(4) By constructing the permanent magnet of the rotor 2 using the rare-earth magnet 2b and the ferrite magnet 2c, it is possible to obtain the cost-efficient electric motor 100, as compared with the case of constructing the rotor only with the rare-earth magnet 2b.

(5) In a case where both the rare-earth magnet 2b and the ferrite magnet 2c are extended close to the rotational-position detection sensor 7, the cost of the rotor increases as the usage of the rare-earth magnet 2b increases. In the rotor 2 according to the present embodiment, because the axial length of the rare-earth magnet 2b is shorter than the axial length of the ferrite magnet 2c, the usage of the rare-earth magnet 2b is suppressed and the cost-efficient electric motor 100 can be obtained as compared with the case where both the rare-earth magnet 2b and the ferrite magnet 2c are extended close to the rotational-position detection sensor 7.

Next, a method of manufacturing the rotor 2 will be described with reference to FIGS. 2 to 5.

Figure 2:
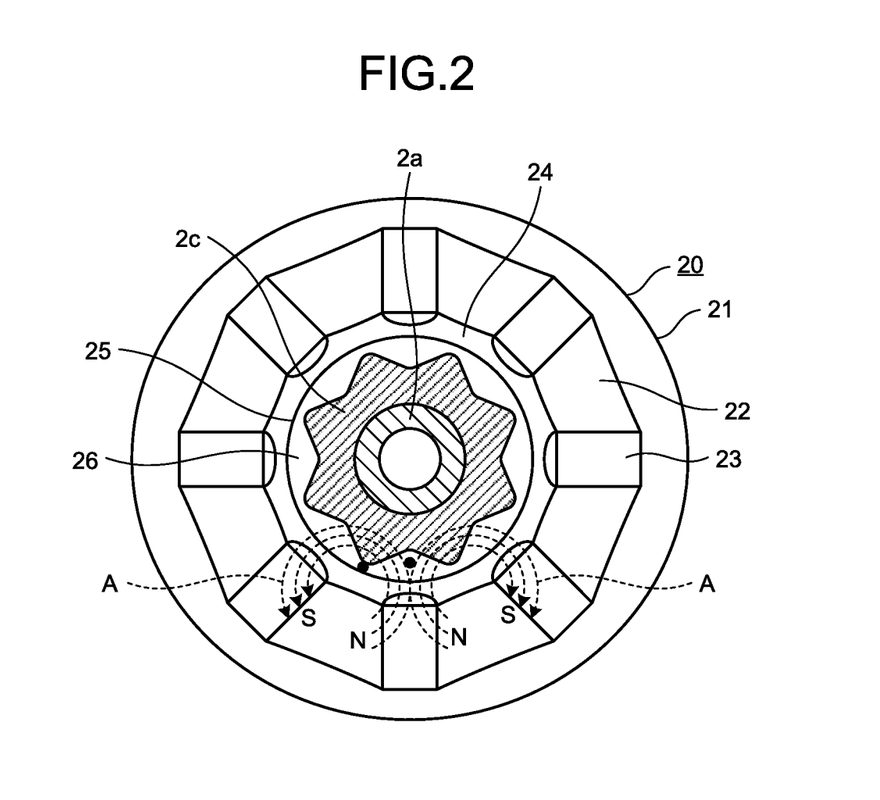
FIG. 2 is a view illustrating a state of a metal mold during injection molding of a ferrite magnet constituting a rotor illustrated in FIG. 1.
Figure 3:
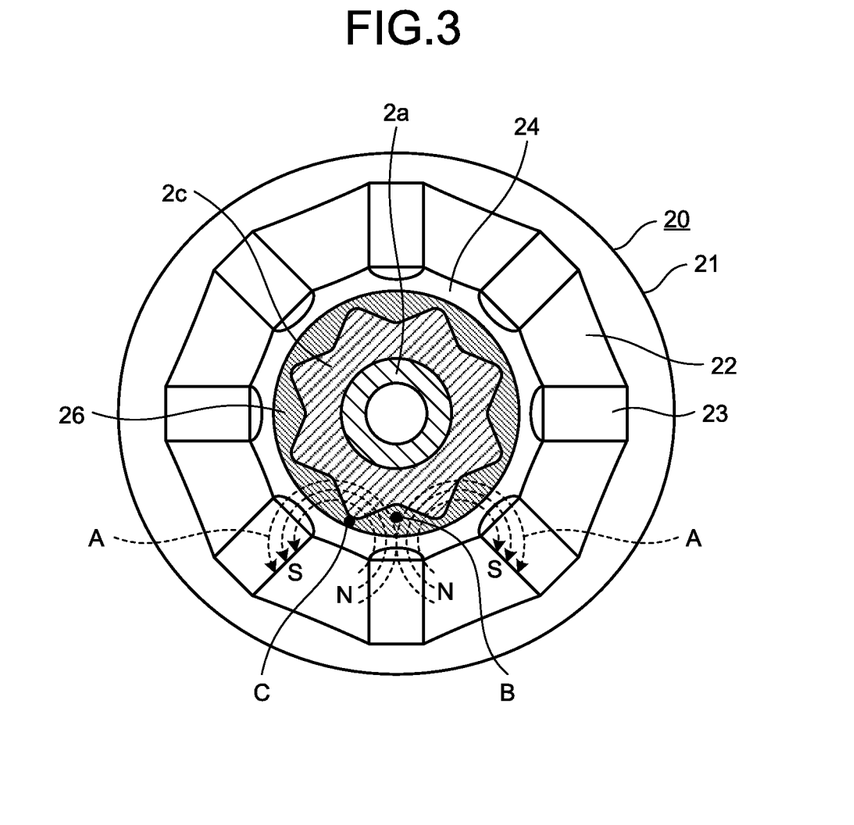
FIG. 3 is a view illustrating a state of the metal mold during injection molding of a rare-earth magnet constituting the rotor illustrated in FIG. 1.
Figure 4:
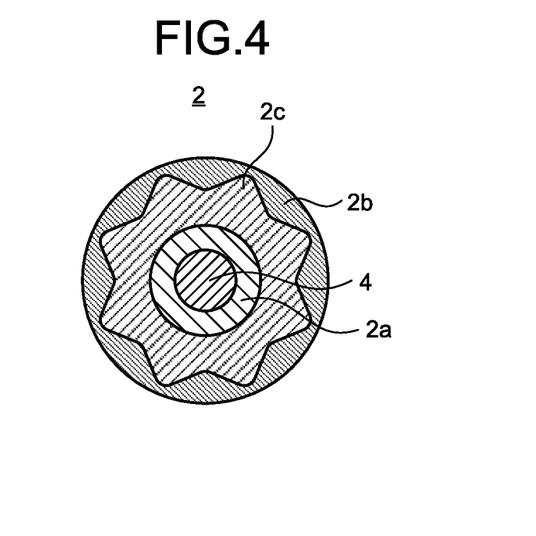
FIG. 4 is a view of the rotor formed by combining a rotating shaft with a rotating body molded with the metal mold illustrated in FIG. 3, viewed from the axial end face side.
Figure 5:
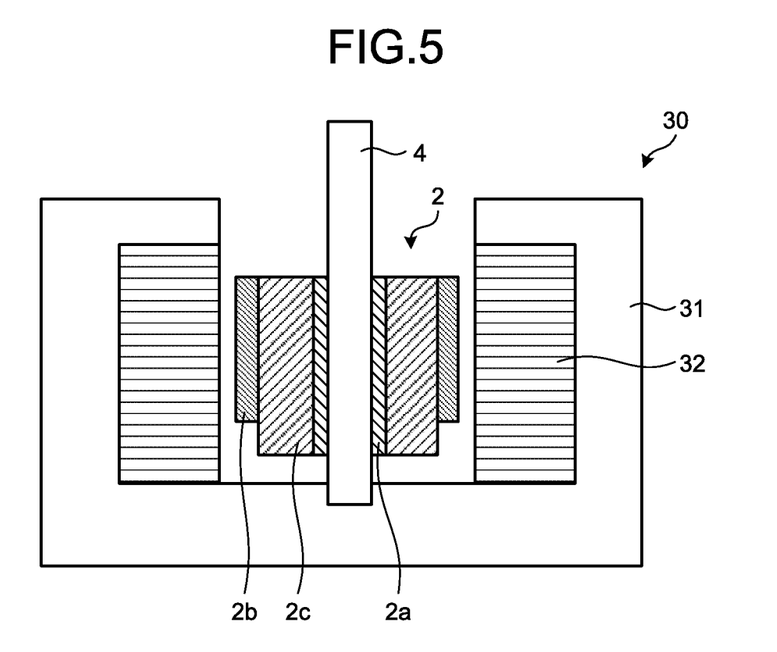
FIG. 5 is a cross-sectional view of a magnetizing device for magnetizing the rotor illustrated in FIG. 4.

FIG. 2 is a view illustrating a state of a metal mold during injection molding of the ferrite magnet constituting the rotor illustrated in FIG. 1. FIG. 3 is a view illustrating a state of the metal mold during injection molding of the rare-earth magnet constituting the rotor illustrated in FIG. 1. FIG. 4 is a view of the rotor formed by combining the rotating shaft with a rotating body molded with the metal mold illustrated in FIG. 3, viewed from the axial end face side. FIG. 5 is a cross-sectional view of a magnetizing device for magnetizing the rotor illustrated in FIG. 4.

The metal mold 20 illustrated in FIGS. 2 and 3 includes an outer shell mold 21, a magnetic field orienting permanent magnet 22, and eight magnetic field orientation yokes 23. The magnetic field orienting permanent magnet 22 is disposed in the outer shell mold 21. The eight magnetic field orientation yokes 23 are disposed inside the outer shell mold 21 in the rotational direction at regular intervals. The magnetic field orienting permanent magnet 22 and the plurality of magnetic field orientation yokes 23 constitute a magnetic circuit for applying orientation magnetic fields A by which the rare-earth magnet 2b are magnetized to have eight magnetic poles in the polar anisotropic orientation. An annular nonmagnetic ring 24 is disposed in contact with the magnetic field orienting permanent magnet 22 and the plurality of magnetic field orientation yokes 23 inside the magnetic field orienting permanent magnet 22 and the plurality of magnetic field orientation yokes 23. As a result, the position of the axial center of the nonmagnetic ring 24 coincides with the position of the axial center of the outer shell mold 21.

As a first step, in a case where the ferrite magnet 2c is molded on the outer circumference of the rotor core 2a, as illustrated in FIG. 2, a cavity 25 for molding the rare-earth magnet 2b is disposed inside the nonmagnetic ring 24, and a dummy insert 26 to be removed at the time of molding the rare-earth magnet 2b is inserted into the inner circumference of the cavity 25. In the metal mold 20, with the rotor core 2a disposed in the center of the cavity 25, a ferrite-based bonded magnet is injection-molded on the outer circumference of the rotor core 2a while the orientation magnetic fields A are applied. Consequently, the ferrite magnet 2c magnetized in the polar anisotropic orientation is obtained.

As a second step, in a case where the rare-earth magnet 2b is molded on the outer circumference of the ferrite magnet 2c, the dummy insert 26 illustrated in FIG. 2 is removed. After that, as illustrated in FIG. 3, while the orientation magnetic fields A are applied, a rare-earth-based bonded magnet is injection-molded between the cavity 25 and the ferrite magnet 2c after the removal of the dummy insert 26. Consequently, the rare-earth magnet 2b magnetized in the polar anisotropic orientation is obtained. A portion where the orientation magnetic fields A are concentrated to maximize the surface magnetic flux density is a center portion B of each magnetic pole, and a portion with the lowest surface magnetic flux density is an interpolar portion C of adjacent magnetic poles. The ferrite magnet 2c and the rare-earth magnet 2b are integrated with each other by fusion joining of thermoplastic resins which are binder components included in the ferrite magnet 2c and the rare-earth magnet 2b, whereby a composite bonded magnet compact subjected to the continuous magnetic field orientation can be obtained.

As a third step, the rotor 2 is obtained by inserting the rotating shaft 4 into the composite bonded magnet compact obtained in the second step as illustrated in FIG. 4.

In this manner, the ferrite magnet 2c and the rare-earth magnet 2b are molded and subjected to the magnetic field orientation using the identical magnetic circuit. Consequently, the ferrite magnet 2c and the rare-earth magnet 2b are bonded to each other by the fusion joining of the binder components and the shrinkage force generated upon cooling of the rare-earth magnet 2b, and it is possible to facilitate the continuous polar anisotropic orientation for both the ferrite magnet 2c and the rare-earth magnet 2b.

In the case of the reverse procedure of the procedure illustrated in FIGS. 2 and 3, that is, in a case where the ferrite magnet 2c is molded after the rare-earth magnet 2b is molded, the rare-earth magnet 2b undergoes thermal histories for twice, and the injection temperature for molding the ferrite magnet 2c reaches 260° C. to 300° C. Therefore, there is a problem in that the rare-earth magnet 2b is oxidized and deteriorated due to the temperature, so that the magnetic characteristics are degraded. On the other hand, in the case where the ferrite magnet 2c and the rare-earth magnet 2b are molded in the procedure illustrated in FIGS. 2 and 3, the rare-earth magnet 2b does not undergo thermal histories for twice, and the deterioration of the magnetic characteristics can be suppressed.

The Nd—Fe—B-based rare-earth magnet 2b is advantageous for improving the motor efficiency because of its large magnetic force. On the other hand, because the particle size of the Sm—Fe—N-based rare-earth magnet 2b is close to the particle size of the magnetic powder of the ferrite magnet 2c with the use of the ferrite-based magnetic powder, the Sm—Fe—N-based rare-earth magnet 2b can easily secure continuity between two layers in continuous magnetic field orientation molding, as compared with the Nd—Fe—B-based rare-earth magnet 2b having a comparatively large particle size. The Sm—Fe—N-based rare-earth magnet 2b has an effect of obtaining a smooth magnetic flux density distribution, and is advantageous in terms of quality and cost.

Because the radial thickness of the rare-earth magnet 2b at the center portion B of the magnetic pole is different from that at the interpolar portion C of the magnetic pole, an effect can be achieved where the distribution waveform of the surface magnetic flux density can be controlled to have an arbitrary shape. For example, the surface magnetic flux density can be concentrated on the center portion B of the magnetic pole simply by making the radial thickness of the rare-earth magnet 2b located at the center portion B of the magnetic pole larger than the radial thickness at the interpolar portion C of the magnetic pole.

When the rotating shaft 4 is inserted into the rotor core 2a in advance in the first step, the process of the third step can be omitted. In the example described in the first step, the ferrite magnet 2c is molded on the outer circumferential surface of the rotor core 2a. When the rotor core 2a is used in this way, it becomes easier to adjust the torsional resonance. However, by omitting the rotor core 2a and molding the ferrite magnet 2c directly on the outer circumferential surface of the rotating shaft 4, the diameter of the rotor 2 can be reduced, whereby the size of the electric motor 100 can be reduced.

As a fourth step, the rotor 2 with the molded ferrite magnet 2c and rare-earth magnet 2b is set in the magnetizing device illustrated in FIG. 5. The magnetizing device 30 includes a cone-shaped frame 31 having a recess and a magnetizing yoke 32 disposed in the recess of the frame 31. The magnetizing yoke 32 is formed so that the axial length thereof is longer than the axial length of the rotor 2. The rotor 2 is inserted into an opening portion of the magnetizing device 30 so that the rare-earth magnet 2b faces the magnetizing yoke 32 as illustrated in the drawing. When a large current flows to a winding of the magnetizing yoke 32 instantaneously, the rare-earth magnet 2b and the ferrite magnet 2c are simultaneously magnetized in the direction orthogonal to the axial direction due to the magnetic fluxes from the magnetizing yoke 32. Consequently, the N and S poles of the rare-earth magnet 2b and the N and S poles of the ferrite magnet 2c are magnetized in phase with each other.

In a conventional rotor of a general electric motor in which a main magnet for generating the motor torque and a rotational-position detecting magnet are separated, the main magnet and the rotational-position detecting magnet are magnetized by separate magnetizing yokes. Therefore, when a phase deviation occurs between the respective magnetizing yokes, the main magnet and the rotational-position detecting magnet are misoriented due to the magnetization. A magnetic deviation occurs between the rotational position of the rotor and the rotational position of the rotational-position detecting magnet. The phase deviation in the magnetizing yokes is also accumulated, and it becomes difficult to obtain accuracy.

In the rotor 2 according to the present embodiment, the N and S poles of the rare-earth magnet 2b and the N and S poles of the ferrite magnet 2c are magnetized in phase with each other using the one magnetizing yoke 32. Therefore, it is possible to provide an electric motor of high quality without causing a phase deviation as in the conventional rotor of the general electric motor.

In the electric motor 100 according to the present embodiment, the rotor core 2a is used between the rotating shaft 4 and the ferrite magnet 2c. The rotor core 2a may be formed by laminating a plurality of iron core pieces punched out from an electromagnetic steel sheet base material, or may be made of an insulating resin such as PBT, PPS, LCP, or PET described above. The rotor 2 may be configured in such a manner that the ferrite magnet 2c is provided directly on the outer circumferential surface of the rotating shaft 4, without the rotor core 2a. This configuration makes it possible to reduce the size of the electric motor 100.

The rare-earth magnet 2b and the ferrite magnet 2c may be formed in such a manner that the rare-earth magnet 2b and the ferrite magnet 2c are manufactured as sintered ring magnets and affixed with an adhesive to be fixed to each other, or formed in such a manner that the rare-earth magnet 2b and the ferrite magnet 2c are manufactured as bonded magnets containing binder components and integrally molded. The latter manner is advantageous in terms of productivity and dimensional accuracy in the case of a small motor. Polyamide-12 (PA12), polyamide-6 (PA6), polyamide-66 (PA66), PBT, PET, PPS, or LCP is used for a binder resin which is the binder component, depending on the required heat resistance or moldability.

In the electric motor 100 of FIG. 1, the rotational-position detection sensor 7 is disposed at a position facing the one axial end face 2c1 of the ferrite magnet 2c. However, the position of the rotational-position detection sensor 7 is not limited to the illustrated example. For example, the rotational-position detection sensor 7 may be disposed at a position facing the outer circumferential surface of the one axial end portion 2c3 of the ferrite magnet 2c among the outer circumferential surface 2c2 of the ferrite magnet 2c. In particular, the magnetic fluxes leaking in the axial direction from the one axial end face 2c1 of the ferrite magnet 2c are detected by the rotational-position detection sensor 7. In order to accurately detect these leakage magnetic fluxes, for example, it is desirable that the rotational-position detection sensor 7 be disposed at a position facing the one axial end face 2c1 of the ferrite magnet 2c or a position facing a corner portion between the one axial end face 2c1 of the ferrite magnet 2c and the outer circumferential surface 2c2 of the ferrite magnet 2c.

Furthermore, in the rotor 2, in order to clarify the change in the magnetic fluxes detected by the rotational-position detection sensor 7, that is, switching between the N and S poles of the ferrite magnet 2c, the radial thickness of the ferrite magnet 2c at the center portion B of the magnetic pole may differ from the radial thickness at the interpolar portion C of the adjacent magnetic poles of the plurality of magnetic poles of the ferrite magnet 2c. The difference in the radial thickness of the ferrite magnet 2c is determined in consideration of the positional relationship between the rotational-position detection sensor 7 and the ferrite magnet 2c or the radial thickness of the rare-earth magnet 2b at each center portion B and each interpolar portion C of the magnetic poles of the rare-earth magnet 2b.

As described above, the permanent-magnet electric motor according to the present embodiment is a permanent-magnet electric motor including: a rotor; and a rotational-position detection sensor configured to detect a rotational position of the rotor. The rotor includes: a rotating shaft; an annular ferrite magnet disposed on an outer circumferential surface of the rotating shaft; and a rare-earth magnet disposed on an outer circumferential surface of the ferrite magnet, and a length from a center of the ferrite magnet in an axial direction of the ferrite magnet to an end face of the ferrite magnet on a side of the rotational-position detection sensor in the axial direction of the ferrite magnet is longer than a length from a center of the rare-earth magnet in an axial direction of the rare-earth magnet to an end face of the rare-earth magnet on a side of the rotational-position detection sensor in the axial direction of the rare-earth magnet. With this configuration, it is possible to obtain a highly efficient permanent-magnet electric motor with a high degree of position detection accuracy at low cost. In addition, in the permanent-magnet electric motor according to the present embodiment, because the ferrite magnet is disposed inside the rare-earth magnet, the magnetic force of the rare-earth magnet is assisted by the magnetic force of the ferrite magnet, and a certain magnetic force can be obtained even though the usage of the rare-earth magnet is relatively reduced, whereby the cost-efficient rotor can be obtained.

In the permanent-magnet electric motor according to the present embodiment, the rare-earth magnet and the ferrite magnet are simultaneously magnetized by using one magnetizing yoke. Because the entire ferrite magnet including the one axial end portion of the ferrite magnet extending in the axial direction and the rare-earth magnet are magnetized by the identical magnetizing yoke, the magnetic flux orientation for the rare-earth magnet serving as a main magnet unit for generating the motor torque can be the same as that for the one axial end portion of the ferrite magnet functioning as the position detecting magnet. That is, the switching portion between the N and S poles in the rare-earth magnet can be the same as those in the one axial end portion of the ferrite magnet. Therefore, the rotational-position detection sensor can accurately detect the position of the main magnet via the position detecting magnet, and a permanent-magnet electric motor of high quality can be obtained, as compared with the conventional general electric motor in which the main magnet and the rotational-position detecting magnet are magnetized by separate magnetizing yokes.

In the permanent-magnet electric motor according to the present embodiment, the rare-earth magnet is formed by injection molding on radially outward relative to the ferrite magnet formed by injection molding. Therefore, it is possible to suppress the deterioration of the magnetic characteristics without applying a plurality of thermal histories to the rare-earth magnet which is inferior to the ferrite magnet in thermal demagnetization durability, and it is possible to obtain the permanent-magnet electric motor with a good degree of position detection accuracy.

In the permanent-magnet electric motor according to the present embodiment, the Sm—Fe—N-based magnetic powder is used for the rare-earth magnet. Because the particle size of the ferrite magnet compact with the use of the ferrite-based magnetic powder is close to that of the rare-earth magnet $2b$ compact with the use of the Sm—Fe—N-based magnetic powder, the Sm—Fe—N-based rare-earth magnet $2b$ can easily secure continuity between two layers in continuous magnetic field orientation molding, as compared with a case where the Nd—Fe—B-based magnetic powder having a comparatively large particle size is used, and the use of the Sm—Fe—N-based rare-earth magnet $2b$ can cause an effect of obtaining a smooth magnetic flux density distribution.

The configuration described in the above-mentioned embodiment indicates an example of the content of the present invention. The configuration can be combined with another well-known technique, and a part of the configuration can be omitted or changed in a range not departing from the gist of the present invention.

The invention claimed is:
1. A permanent-magnet electric motor comprising:
a rotor; and
a rotational-position detection sensor to detect a rotational position of the rotor, wherein
the rotor includes:
a rotating shaft;
an annular ferrite magnet disposed on an outer circumferential surface of the rotating shaft; and
a rare-earth magnet disposed on an outer circumferential surface of the ferrite magnet, and
a length from a center of the ferrite magnet in an axial direction of the ferrite magnet to an end face of the ferrite magnet on a side of the rotational-position detection sensor in the axial direction of the ferrite magnet is longer than a length from a center of the rare-earth magnet in an axial direction of the rare-earth magnet to an end face of the rare-earth magnet on a side of the rotational-position detection sensor in the axial direction of the rare-earth magnet, and
the ferrite magnet is disposed between the rotating shaft and the rare-earth magnet, and only one end of the ferrite magnet extends toward the rotational-position detection sensor.

2. The permanent-magnet electric motor according to claim 1, further comprising a stator core, wherein
an axial length of the rare-earth magnet is same as an axial length of the stator core.

3. The permanent-magnet electric motor according to claim 1, wherein
the rare-earth magnet and the ferrite magnet are simultaneously magnetized by one magnetizing yoke.

4. The permanent-magnet electric motor according to claim 1, wherein
the rare-earth magnet is formed by injection molding radially outward relative to the ferrite magnet formed by injection molding.

5. The permanent-magnet electric motor according to claim 1, wherein
samarium, ferrum, and nitrogen-based magnetic powder are used for the rare-earth magnet.

* * * * *